United States Patent [19]

Scaglione et al.

[11] 3,859,241

[45] Jan. 7, 1975

[54] VULCANIZABLE CHLORINATED POLYHYDROCARBON COMPOSITIONS, PROCESS FOR THEIR VULCANIZATION AND VULCANIZED ELASTOMERS THUS OBTAINED

[75] Inventors: Paolo Scaglione, Milan; Valentino Zamboni, Busto Arsizio, both of Italy

[73] Assignee: Montecatini Edison S.p.A., Milan, Italy

[22] Filed: June 9, 1971

[21] Appl. No.: 151,573

[30] Foreign Application Priority Data
June 12, 1970  Italy .................................. 25898/70

[52] U.S. Cl. ................. 260/31.2 R, 260/33.6 AQ, 260/33.6 UA, 260/33.8 UA, 260/41 B, 260/41.5 R, 260/93.1, 260/94.7 HA, 260/796
[51] Int. Cl... C08c 11/08, C08c 11/22, C08c 11/36
[58] Field of Search ...... 260/93.1, 94.7 HA, 31.2 R, 260/33.8 UA, 33.6 PQ, 41 B

[56] References Cited
UNITED STATES PATENTS

| | | | |
|---|---|---|---|
| 2,944,578 | 7/1960 | Baldwin et al. | 260/94.7 HA |
| 3,405,204 | 10/1968 | McCormack | 260/41 B X |
| 3,551,402 | 12/1970 | Edwards et al. | 260/94.7 HA |

OTHER PUBLICATIONS

Bertelloti–Atti Congr. Intern. Materie Plastiche, 14, 345–353 (1962); Chem. Abs., 59, 14179–14180.

Carl–Neoprene Latex (du Pont, Wilmington, Del.), (1962), pages 89–90 & 68.

Alliger et al., Vulcanization of Elastomers, (Reinhold), (N.Y.), (1964), pages 268–271.

Zimmerman et al., Handbook of Material Trade Names, 1953, p. 579.

*Primary Examiner*—Allan Lieberman
*Assistant Examiner*—H. H. Fletcher
*Attorney, Agent, or Firm*—Hubbell, Cohen and Stiefel

[57] ABSTRACT

Vulcanization of chlorinated polyalkenamers. Vulcanizing system comprises (a) an organic base condensation product of ethyl chloride, formaldehyde, and ammonia and (b) a bivalent metal oxide, namely MgO, ZnO, PbO, or mixtures thereof.

7 Claims, No Drawings

3,859,241

VULCANIZABLE CHLORINATED POLYHYDROCARBON COMPOSITIONS, PROCESS FOR THEIR VULCANIZATION AND VULCANIZED ELASTOMERS THUS OBTAINED

BACKGROUND OF THE INVENTION

1. Field of the Invention

The present invention relates to new vulcanizable compositions of chlorinated polyhydrocarbons, a process for the vulcanization of such vulcanizable compositions, vulcanized elastomers obtained by vulcanizing the foregoing compositions, and to the use of the vulcanized elastomers in special applications.

2. Description of the Prior Art

Vulcanized halogenated elastomers which are already known made up primarily of vulcanized polychloroprene compositions. Such polymers are widely used in the automobile industry, particularly for cables, gaskets, and contour profiles. The main drawbacks of these vulcanized polychloroprene products are due to the presence of numerous double bonds along the macromolecules. These double bonds are the cause of a considerable degree of instability of the vulcanized products to weathering and, in particular, to oxygen and ozone. These drawbacks can be reduced, but not eliminated, by the use of antioxidants. The relative high price of polychloroprene presents still another drawback.

In order to overcome the drawback of the presence of unsaturation in the polymeric chains, the use of vulcanized chlorinated or chlorosulfonated polyethylenes has been proposed. Apart from their high cost, these products suffer the disadvantage of having elastic characteristics which are considerably poorer than those of vulcanized polychloroprene.

Also known are vulcanized elastomers of halogenated polyhydrocarbons, more particularly, of halogenated polyalkenamers prepared from vulcanization recipes based on sulfur, accelerators and metal oxides. Such elastomers have a rather low elastic modulus at 200 percent elongation, which indicates a low degree of vulcanization.

SUMMARY OF THE INVENTION

It has now been found that it is possible to obtain vulcanized chlorinated polyalkenamer compositions endowed with very good elastic characteristics by using for their vulcanization a vulcanizing system comprising:

1. a basic organic agent made up of the condensation product of ethyl chloride, formaldehyde and ammonia, which is commercially available under the commercial names "Vulcafor EFA" (commercial product I.C.I.) and "Trimene base" (commercial product of Naugatuck Chemical), and 2. one or more bivalent metal oxides selected from the group consisting of magnesium oxide, zinc oxide and lead oxide (PbO).

DESCRIPTION OF THE PREFERRED EMBODIMENTS

The foregoing basic vulcanizing agent is already known as a thermal sensitizer for the vulcanization of foamed latexes of polydiene rubbers. More particularly, this basic vulcanizing agent is used for the vulcanization of acrylic elastomers and, in order to better exert its vulcanizing action, there is required the use of co-agents such as sulfur.

Heretofore, its use was not known in the vulcanization of chlorinated elastomers, either alone or in combination with sulfur as a co-agent. When used in the vulcanization of polychloroprene, even in combination with magnesium oxide as co-agent, the results obtained have been altogether unsatisfactory, as shown in comparative Example 4, below.

It was, therefore, completely unexpected that its use, with magnesium oxide or with other bivalent metal oxides in chlorinated polyalkenamer compositions, would result in vulcanized products endowed with valuable elastic properties.

The vulcanizable compositions of this invention comprise:

A. one or more linear poly(dichloroalkenamers) the repeating units of which are: $-CHCl-CHCl-(-CHR-)_n$, where R is hydrogen, methyl or phenyl, and where $n$ is a whole number from 3 to 10, and B. a vulcanizing agent made up of (1) a basic organic agent, which is the condensation product of ammonia, ethyl chloride and formaldehyde, and which is commercially available under the commercial names "Vulcafor EFA" (commercial product I.C.I.) and "Trimene base" (commercial product of Naugatuck), in an amount of from 3 to 12 parts by weight, and preferably from 7 to 10 parts by weight, per 100 parts by weight of poly(dichloroalkenamer), and (2) one or more bivalent metal oxides selected from the group consisting of magnesium oxide, zinc oxide and lead monoxide, in an amount from 10 to 40 parts by weight, and preferably from 15 to 25 parts by weight, per 100 parts by weight of poly(dichloroalkenamer).

Besides the above main characterizing components, the compositions of this invention may, if desired, contain other additives known to those skilled in the art.

Vulcanized products of excellent physical-mechanical properties are also obtained by using fillers, either of the reinforcing or non-reinforcing type.

The composition of this invention contemplates the use of all of the fillers based on either carbon black or white fillers, whether active or inert. In addition, there is contemplated the use of plasticizing oils such as, e.g., halogenated oils, ester oils, hydrocarbons (preferably naphthenic or aromatic), or polymeric oils. The quantities and type both of the fillers and of the plasticizing oils, will depend on the nature of the vulcanized product to be obtained, as is well known in the transformation technology. The vulcanized products according to this invention exhibit and maintain all of the characteristics peculiar to highly halogenated elastomers including: non-flammability, resistance to abrasion, resistance to light (light fastness) and weather (atmospheric agents).

The process for the vulcanization of the compositions of this invention involves heating the above-mentioned compositions to a temperature between 120° and 220°C, for a period between 1 and 120 minutes.

The chlorinated polyalkenamers employed in said compositions, which constitute the principal components of the vulcanized products of this invention, are described in commonly assigned copending U.S. Patent Application Ser. No. 870,424, filed on Oct. 10, 1969, and now abandoned.

The most important uses of the chlorinated polyalkenamers vulcanized according to this invention may be categorized as follows: in the electrical field, for insulation and sheathing of special cables, cables for power supply and for the firing of mines, lining of explosive containers, lining of portable cables (riggings), high voltage cables with flame-resistant sheathing, and the like.

Uses for particular manufactured goods include: component parts for automobiles, for instance, for antispeaking protection of the plugs, weather-stripping, transmission belts, soles and heels for special shoes, industrial piping, ship bumpers, and the like.

The examples that follow will further illustrate the invention.

The trade names and symbols used in these examples have the following meanings:

| | |
|---|---|
| Vulcafor EFA | : commercial product, made by I.C.I. |
| Trimene base | : commercial product, made by Naugatuck Chemical. |
| Aroclor 1254 | : chlorinated aromatic plasticizer, commercial product made by Monsanto Co. |
| Unimoll BB | : ester plasticizer, a commercial product made by Bayer A G. |
| Ultrasil VN 3 | : silica filler, a commercial product made by Fullstoffgesellschaft GmbH. |
| Physical-mechanical properties | : according to ASTM D 480. |
| Tear resistance | : according to ASTM D 624 Die C. |
| Hardness | : expressed in International Degrees of Hardness according to ASTM D 1415. |
| Tension set | : percentage read after 1 minute from relaxation of test pieces previously maintained for 1 hour under a deformtion of 200%. |
| Mesamoll plasticizer | : a commercial product made by Bayer |
| Circolight oil | : a commercial product made by Sun Oil Company. |
| Maglite D | : magnesium oxide. |
| Na - 22 | : mercaptoimmidazoline. |

EXAMPLE 1

100 parts by weight of a chlorinated polyoctenamer with a chlorine content of 38 percent by weight and an inherent viscosity, in cyclohexanone at 30°C, of 2.1 dl/g, were mixed in an open mixer, with the following additives:

| | Parts by weight |
|---|---|
| Carbon black FEF | : 50 |
| PbO | : 20 |
| Vulcafor EFA | : 4 |

The thus obtained mixture was vulcanized for 60 minutes at 150°C. The physical-mechanical characteristics of the vulcanized product, determined according to ASTM specifications at 23°C, were the following:

| | | |
|---|---|---|
| Tensile strength | : kg/sq.cm | 300 |
| Elongation at break | : % | 280 |
| Modulus at 200% | : kg/sq.cm | 229 |
| Hardness (IRHD) | : | 84 |
| Tear resistance | : kg/cm | 58 |
| Tension set | : % | 55 |

Comparative example (outside the scope of the invention):

100 parts by weight of a chlorinated polyoctenamer of the same composition as used in Example 1 was mixed in an open mixer with the following additives:

| | Parts by weight |
|---|---|
| Stearic acid | : 0.15 |
| Magnesium oxide | : 5 |
| Zinc oxide | : 10 |
| Carbon black FEF | : 50 |
| mercaptobenzothiazol | : 1 |
| Tetramethylthiuram disulfide | : 2 |
| Sulfur | : 2 |

This mixture was vulcanized for 60 minutes at 150°C. The characteristics of the vulcanized product were the following:

| | | |
|---|---|---|
| Tensile strength | : kg/sq.cm | 202 |
| Elongation at break | : % | 360 |
| Modulus at 200% | : kg/sq.cm | 138 |
| Tension set | : % | 55 |

A comparison of the data for the modulus of elasticity at 200 percent of the two above mentioned vulcanized products shows that the composition of the comparative example had a much lower degree of vulcanization.

EXAMPLE 2

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

| | Parts by weight |
|---|---|
| Carbon black FEF | : 50 |
| PbO | : 20 |
| Vulcafor EFA | : 6 |

The mixture thus obtained was then vulcanized for 60 minutes at 150°C. The physical-mechanical characteristics of the vulcanized product, determined according to ASTM specifications at 23°C, were the following:

| | | |
|---|---|---|
| Tensile strength | : kg/sq.cm | 290 |
| Elongation at break | : % | 280 |
| Modulus at 200% | : kg/sq. cm | 237 |
| Hardness (IRHD) | : | 84 |
| Tear resistance | : kg/cm | 56 |
| Tension set | : % | 40 |

EXAMPLE 3

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

| | Parts by weight |
|---|---|
| Carbon black FEF | : 50 |
| PbO | : 20 |
| Vulcafor EFA | : 8 |

The mixture thus obtained was vulcanized for 60 minutes at 150°C. The physical-mechanical characteristics of the vulcanized product, determined according to ASTM specifications at 23°C, were the following:

| | | |
|---|---|---|
| Tensile strength | : kg/sq. cm | 290 |
| Elongation at break | : % | 270 |
| Modulus at 200% | : kg/sq. cm | 226 |
| Hardness (IRHD) | : | 84 |
| Tear resistance | : kg/cm | 56 |
| Tension set | : % | 25 |

EXAMPLE 4

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

| | Parts by weight |
|---|---|
| Carbon black FEF : | 50 |
| Vulcafor EFA : | 8 |
| MgO : | 20 |

The mixture thus obtained was vulcanized for 60 minutes at 150°C. The physical-mechanical characteristics of the vulcanized product, determined according to ASTM D-412, at 23°C, were the following:

| Tensile strength | : kg/sq.cm | 182 |
|---|---|---|
| Elongation at break | : % | 250 |
| Modulus at 200% | : kg/sq.cm | 155 |
| Hardness (IRHD) | : | 86 |
| Tension set | : % | 67 |

Comparative Example (outside the scope of this invention):

100 parts by weight of a polychloroprene, Neoprene W type (a commercial product made by duPont Co.) were mixed in an open mixer with the following additives:

| | Parts by weight |
|---|---|
| Carbon black FEF : | 50 |
| Vulcafor EFA : | 8 |
| MgO : | 20 |

The physical-mechanical characteristics of the vulcanized product, determined according to ASTM D-412, at 23°C, were the following:

| Tensile strength | : kg/sq.cm | 158 |
|---|---|---|
| Elongation at break | : % | 80 |

The thus obtained material was rigid and inelastic, as indicated by the low value of the elongation at break.

EXAMPLE 5

100 parts by weight of a chlorinated polyoctenamer with a chlorine content of 38 percent by weight and having an inherent viscosity in cyclohexanone at 30°C, of 2.1 dl/g, were mixed in an open mixer with the following additives:

| | Parts by weight |
|---|---|
| Carbon black FEF : | 50 |
| Vulcafor EFA : | 8 |

The mixture thus obtained was divided into five equal parts, each of which was then mixed with different oxides and mixtures thereof, as reported in the following table.

The mixtures were then vulcanized for 60 minutes at 150°C and the physical-mechanical characteristics of the vulcanized products were the following:

| Oxides (parts % by weight with respect to the polymer) | ZnO 20 | PbO 20 | MgO 10 ZnO 10 | MgO 10 PbO 10 | ZnO 10 PbO 10 |
|---|---|---|---|---|---|
| Tensile strength: kg/sq.cm | 215 | 290 | 198 | 244 | 245 |
| Elongation at break: % | 350 | 270 | 290 | 270 | 250 |
| Modulus at 200%: kg/sq.cm | 174 | 226 | 147 | 186 | 220 |
| Hardness (IRHD): | 86 | 84 | 84 | 84 | 86 |
| Tension set: % | 28 | 25 | 80 | 43 | 30 |

EXAMPLE 6

100 parts by weight of a chlorinated polyoctenamer with a chlorine content of 38 percent by weight and having an inherent viscosity in cyclohexanone at 30°C, of 2.1 dl/g, were mixed in an open mixer with the following additives:

| | Parts by weight |
|---|---|
| Carbon black HAF : | 50 |
| PbO : | 20 |
| Vulcafor EFA : | 2 |

The thus obtained mixture was vulcanized for 60 minutes at 150°C. The physical-mechanical characteristics of the vulcanized product were the following:

| Tensile strength | : kg/sq.cm | 330 |
|---|---|---|
| Elongation at break | : % | 240 |
| Hardness (IRHD) | : | 86 |
| Modulus at 200% | : kg/sq.cm | 282 |
| Tear resistance | : kg/cm | 48 |
| Tension set | : % | 25 |

EXAMPLE 7

100 parts by weight of a chlorinated polyoctenamer with a chlorine content of 38 percent by weight and having an inherent viscosity in cyclohexanone at 30°C, of 2.1 dl/g, were mixed in an open mixer with the following additives:

| | Parts by weight |
|---|---|
| Carbon black SRF : | 50 |
| PbO : | 25 |
| Vulcafor EFA : | 8 |

The thus obtained mixture was vulcanized for 60 minutes at 150°C. The physical-mechanical characteristics of this vulcanized product were the following:

| Tensile strength | : kg/sq.cm | 359 |
|---|---|---|
| Elongation at break | : % | 240 |
| Modulus at 200% | : kg/sq.cm | 303 |
| Hardness (IRHD) | : | 86 |
| Tear resistance | : kg/cm | 51 |
| Tension set | : % | 25 |

EXAMPLE 8

100 parts by weight of a chlorinated polyoctenamer with a chlorine content of 38 percent by weight and having an inherent viscosity in cyclohexanone at 30°C, of 2.1 dl/g, were mixed in an open mixer with the following additives:

|  |  | Parts by weight |
|---|---|---|
| Carbon black MT | : | 70 |
| PbO | : | 20 |
| Vulcafor EFA | : | 8 |

The thus prepared mixture was then vulcanized for 60 minutes at 150°C. The physical-mechanical characteristics of this vulcanized product were the following:

| Tensile strength | : kg/sq.cm | 150 |
|---|---|---|
| Elongation at break | : % | 350 |
| Modulus at 200% | : kg/sq.cm | 105 |
| Modulus at 300% | : kg/sq.cm | 139 |
| Hardness (IRHD) | : | 78 |
| Tear resistance | : kg/cm | 44 |
| Tension set | : % | 18 |

EXAMPLE 9

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

|  |  | Parts by weight |
|---|---|---|
| Silicon dioxide (Ultrasil VN3) | : | 40 |
| PbO | : | 20 |
| Vulcafor EFA | : | 8 |

The mixture thus obtained was vulcanized for 60 minutes at 150°C. and the physical-mechanical characteristics of the vulcanized product were the following:

| Tensile strength | : kg/sq.cm | 330 |
|---|---|---|
| Elongation at break | : % | 600 |
| Modulus at 200% | : kg/sq.cm | 57 |
| Modulus at 300% | : kg/sq.cm | 86 |
| Hardness (IRHD) | : | 86 |
| Tear resistance | : kg/cm | 81 |
| Tension set | : % | 45 |

EXAMPLE 10

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

|  |  | Parts by weight |
|---|---|---|
| Kaolin | : | 60 |
| PbO | : | 20 |
| Vulcafor EFA | : | 8 |

The thus obtained mixture was vulcanized at 150°C for 60 minutes. The physical-mechanical characteristics of the vulcanized product were the following:

| Tensile strength | : kg/sq.cm | 177 |
|---|---|---|
| Elongation at break | : % | 520 |
| Modulus at 200% | : kg/sq.cm | 47 |
| Modulus at 300% | : kg/sq.cm | 68 |

| -Continued |  |  |
|---|---|---|
| Hardness (IRHD) |  | 75 |
| Tear resistance | : kg/cm | 38 |
| Tension set | : % | 25 |

EXAMPLE 11

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

|  |  | Parts by weight |
|---|---|---|
| Carbon black FEF | : | 50 |
| Aroclor 1254 (plasticizer) | : | 20 |
| PbO | : | 15 |
| Vulcafor EFA | : | 8 |

The thus obtained mixture was then vulcanized for 60 minutes at 150°C. The physical-mechanical characteristics of the vulcanized product were the following:

| Tensile strength | : kg/sq.cm | 268 |
|---|---|---|
| Elongation at break | : % | 360 |
| Modulus at 200% | : kg/sq.cm | 145 |
| Modulus at 300% | : kg/sq.cm | 232 |
| Hardness (IRHD) | : | 77 |
| Tension set | : % | 25 |

EXAMPLE 12

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

|  |  | Parts by weight |
|---|---|---|
| Carbon black FEF | : | 50 |
| Unimoll BB (plasticizer) | : | 20 |
| PbO | : | 20 |
| Vulcafor EFA | : | 8 |

The thus obtained mixture was then vulcanized for 20 minutes at 165°C. The physical-mechanical characteristics of the vulcanized product were the following:

| Tensile strength | : kg/sq.cm | 220 |
|---|---|---|
| Elongation at break | : % | 400 |
| Modulus at 200% | : kg/sq.cm | 106 |
| Modulus at 300% | : kg/sq.cm | 180 |
| Hardness (IRHD) | : | 77 |
| Tear resistance | : kg/cm | 55 |
| Tension set | : % | 23 |

EXAMPLE 13

This example is based on the comparison of the properties before and after thermal ageing for 2 days at 120°C, between a chlorinated polyoctenamer and a polychloroprene (Neoprene W, a commercial product made by duPont Co.). The elastomers were vulcanized with the following recipes:

|  | Parts by weight |
|---|---|
| A: Chlorinated polyoctenamer |  |

|   | | Parts by weight |
|---|---|---|
|   | (38% by weight of chlorine) : | 100 |
|   | PbO : | 20 |
|   | Carbon black FEF : | 50 |
|   | Mesamoll (plasticizer) : | 20 |
|   | Vulcafor EFA : | 8 |
| B: | Polychloroprene : | 100 |
|   | Stearic acid : | 0.5 |
|   | Maglite D (MgO) : | 4 |
|   | Carbon black FEF : | 50 |
|   | Circolight oil : | 20 |
|   | ZnO : | 5 |
|   | Mercaptoimmidazoline (Na-22) : | 0.5 |

The mixtures A and B were then vulcanized for 60 minutes at 150°C. The physical-mechanical characteristics of the two vulcanized products, determined before and after thermal ageing, were the following:

| Initial properties: | | A | B |
|---|---|---|---|
| Tensile strength | kg/sq.cm | 282 | 193 |
| Elongation at break | % | 330 | 280 |
| Modulus at 100% | kg/sq.cm | 54 | 45 |
| Modulus at 200% | kg/sq.cm | 158 | 128 |
| Modulus at 300% | kg/sq.cm | 251 | — |
| Hardness (IRHD) | | 68 | 62 |
| Properties after ageing for 2 days at 120°C: | | | |
| Tensile strength | kg/sq.cm | 285 | 158 |
| Elongation at break | % | 200 | 90 |
| Modulus at 100% | kg/sq.cm | 141 | — |
| Hardness (IRHD) | | 82 | 86 |

EXAMPLE 14

100 parts by weight of a chlorinated polyoctenamer with a chlorine content of 38 percent by weight and having an inherent viscosity, in cyclohexanone at 30°C, of 2.1 dl/g, were mixed in an open mixer with the following additives:

|   | Parts by weight |
|---|---|
| Carbon black FEF : | 50 |
| Aroclor 1242 (plasticizer) : | 30 |
| PbO : | 20 |
| Vulcafor EFA : | 8 |

The thus obtained mixture was divided into two portions and each was then vulcanized for 60 minutes at 150°C, one in the form of plate for stress tests, and the other in the form of a special gasket, suitable as a seal for fuel-tank plugs for cars. The physical and mechanical characteristics as well as the swelling property of the vulcanized products were the following:

| Tensile strength | : kg/sq.cm | 244 |
|---|---|---|
| Elongation at break | : % | 380 |
| Modulus at 200% | : kg/sq.cm | 122 |
| Modulus at 300% | : kg/sq.cm | 201 |
| Hardness (IRHD) | | 70 |
| Residual deformation ($D_1$) | : % | 22 |
| Volume variation after dipping into gasoline (for 70 hours at 25°C) | : % | 0.5 |

EXAMPLE 15

100 parts by weight of a chlorinated polyheptenamer with a chlorine content of 42.5 percent by weight and having an inherent viscosity, in cyclohexanone at 30°C, of 2.4 dl/g, were mixed in an open mixer with the following additives:

|   | Parts by weight |
|---|---|
| Carbon black FEF : | 50 |
| PbO : | 20 |
| Vulcafor EFA : | 8 |

The thus obtained mixture was vulcanized for 60 minutes at 150°C. The physical-mechanical properties of the vulcanized product were the following:

| Tensile strength | : kg/sq.cm | 285 |
|---|---|---|
| Elongation at break | : % | 260 |
| Modulus at 200% | : kg/cm | 235 |
| Hardness (IRDH) | | 86 |
| Tear resistance | : kg/cm | 54 |
| Tension set | : % | 22 |

EXAMPLE 16

100 parts by weight of a chlorinated polydodecenamer with a chlorine content of 30 percent by weight and having as inherent viscosity, in cyclohexanone at 30°C, of 3.0 dl/g, were mixed in an open mixer with the following additives:

|   | Parts by weight |
|---|---|
| Carbon black FEF : | 50 |
| PbO : | 20 |
| Vulcafor EFA : | 8 |

The thus obtained mixture was then vulcanized for 60 minutes at 150°C and the physical-mechanical characteristics of the vulcanized products were the following:

| Tensile strength | : kg/sq.cm | 260 |
|---|---|---|
| Elongation at break | : % | 320 |
| Modulus at 200% | : kg/sq.cm | 154 |
| Modulus at 300% | : kg/sq.cm | 235 |
| Hardness (IRHD) | | 82 |
| Tear resistance | : kg/cm | 58 |
| Tension set | : % | 37 |

EXAMPLE 17

100 parts by weight of a chlorinated polypentenamer with a chlorine content of 49.7 percent by weight and having an inherent viscosity, in cyclohexanone at 30°C, of 1.9 dl/g, were mixed in an open mixer with the following additives:

|   | Parts by weight |
|---|---|
| Carbon black FEF : | 50 |
| Unimoll BB (plasticizer) : | 20 |
| PbO : | 20 |
| Vulcafor EFA : | 8 |

The thus obtained mixture was then vulcanized for 60 minutes at 150°C and the physical-mechanical characteristics of the vulcanized products were the following:

| Tensile strength | : kg/sq.cm | 251 |
|---|---|---|
| Elongation at break | : % | 220 |
| Modulus at 200% | : kg/sq.cm | 240 |
| Hardness (IRHD) | | 80 |
| Tear resistance | : kg/cm | 51 |
| Tension set | : % | 20 |

EXAMPLE 18

100 parts by weight of a chlorinated poly(3- methyl)octenamer with a chlorine content of 35.8 percent by weight and having an inherent viscosity, in cyclohexanone at 30°C, of 1.6 dl/g, were mixed in an open mixer with the following additives:

|  | Parts by weight |
|---|---|
| Carbon black FEF : | 50 |
| PbO : | 20 |
| Vulcafor EFA : | 8 |

The thus obtained mixture was then vulcanized for 60 minutes at 150°C and the physical-mechanical characteristics of the vulcanized products were the following:

| Tensile strength | : | kg/sq.cm | 251 |
| Elongation at break | : | % | 320 |
| Modulus at 200% | : | kg/sq.cm | 120 |
| Modulus at 300% | : | kg/sq.cm | 215 |
| Hardness (IRHD) | : |  | 79 |
| Tear resistance | : | kg/cm | 60 |
| Tension set | : | % | 23 |

EXAMPLE 19

100 parts by weight of a chlorinated poly(3-phenyl)octenamer with a chlorine content of 27.2 percent by weight and having an inherent viscosity, in cyclohexanone at 30°C, of 1.5 dl/g, were mixed in an open mixer with the following additives:

|  | Parts by weight |
|---|---|
| Carbon black FEF : | 50 |
| PbO : | 20 |
| Vulcafor EFA : | 8 |

The thus obtained mixture was then vulcanized for 60 minutes at 150°C and the physical-mechanical characteristics of the vulcanized products were the following:

| Tensile strength | : | kg/sq.cm | 210 |
| Elongation at break | : | % | 360 |
| Modulus at 200% | : | kg/sq.cm | 80 |
| Modulus at 300% | : | kg/sq.cm | 171 |
| Hardness (IRHD) | : |  | 77 |
| Tear resistance | : | kg/cm | 58 |
| Tension set | : | % | 24 |

Variations can, of course, be made without departing from the spirit and scope of the invention.

Having thus described the invention, what is desired to be secured by Letters Patent and hereby claimed is:

1. A vulcanizable composition comprising (A) a linear poly(dichloroalkenamer), the repeating monomeric unit of which is $-CHCl-CHCl-(-CHR-)_n$, wherein R is hydrogen, methyl, or phenyl, and $n$ is a whole number from 3 to 10, and (B) a vulcanizing system made up of (1) an organic base that is the condensation product of ammonia, ethyl chloride and formaldehyde, said condensation product being present in an amount of from about 3 to 12 parts by weight per 100 parts by weight of said poly(dichloroalkenamer), and (2) a bivalent metal oxide selected from the group consisting of magnesium oxide, zinc oxide and lead monoxide, in an amount of from about 10 to 40 parts by weight, per 100 parts by weight of said poly(dichloroalkenamer).

2. The composition of claim 1 wherein the amount of said condensation product is from about 7 to 10 parts by weight, and the amount of said bivalent metal oxide is from about 15 to 25 parts by weight.

3. The composition of claim 1 additionally comprising a reinforcing or non-reinforcing filler.

4. The composition of claim 1 additionally comprising a plasticizing oil.

5. The composition of claim 1 wherein said bivalent metal oxide is lead monoxide, PbO.

6. A heat vulcanized composition comprising (A) a linear poly(dichloroalkenamer), the repeating monomeric unit of which is $-CHCl-CHCl-(-CHR-)_n$, wherein R is hydrogen, methyl, or phenyl, and n is a whole number from 3 to 10, and (B) a vulcanizing system made up of (1) an organic base that is the condensation product of ammonia, ethyl chloride and formaldehyde, said condensation product being present in an amount of from about 3 to 12 parts by weight per 100 parts by weight of said poly(dichloroalkenamer), and (2) a bivalent metal oxide selected from the group consisting of magnesium oxide, zinc oxide and lead monoxide, in an amount of from about 10 to 40 parts by weight, per 100 parts by weight of said poly(dichloroalkenamer).

7. The heat vulcanized composition of claim 6 in the form of gaskets, transmission belts, industrial pipes, or flame-resistant sheathing for high-voltage cables.

* * * * *

PO-1050
(5/69)

UNITED STATES PATENT OFFICE
CERTIFICATE OF CORRECTION

Patent No. 3,859,241          Dated January 7, 1975

Inventor(s) Paolo SCAGLIONE and VALENTINO ZAMBONI

It is certified that error appears in the above-identified patent and that said Letters Patent are hereby corrected as shown below:

Title page, left side, under "Foreign Priority Data": "25898/70" should read -- 25898 A/70 --.

Column 1, line 16: "known made up primarily" should read -- known are made up primarily --.

Column 3, line 29: "deformtion" should read -- deformation --; line 30: "Bayer." should read -- Bayer AG. --.

Signed and sealed this 22nd day of April 1975.

(SEAL)
Attest:

RUTH C. MASON
Attesting Officer

C. MARSHALL DANN
Commissioner of Patents
and Trademarks